(12) United States Patent  (10) Patent No.: US 6,227,377 B1
Bonnet  (45) Date of Patent: *May 8, 2001

(54) AUTOMATED ARRAY SORTER FOR CONVEYORS

(75) Inventor: Henri Bonnet, Atlanta, GA (US)

(73) Assignee: United Parcel Service of America, Inc., Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,056

(22) Filed: Sep. 9, 1997

(51) Int. Cl.[7] ........................................ B07C 5/18
(52) U.S. Cl. .................... 209/650; 209/941; 198/435; 198/587
(58) Field of Search ............................ 209/606, 650, 209/941; 198/435, 587, 588

(56) References Cited

U.S. PATENT DOCUMENTS

| 1,044,547 | 11/1912 | Liggett . | |
| 1,753,036 | 4/1930 | Williamson et al. . | |
| 1,808,134 | 6/1931 | Gotthardt et al. . | |
| 2,212,702 | 8/1940 | Scott . | |
| 3,169,630 | 2/1965 | Christiansen | 198/38 |
| 3,580,141 | 5/1971 | Richter . | |
| 3,606,942 * | 9/1971 | Daniels et al. | 198/435 |
| 3,799,323 | 3/1974 | Schneider . | |
| 3,904,024 | 9/1975 | Smith | 198/119 |
| 4,326,624 | 4/1982 | Ewertowski et al. | 198/472 X |
| 4,813,526 | 3/1989 | Belanger | 198/589 X |
| 4,867,299 | 9/1989 | Fukuoka et al. | 198/463.3 X |
| 5,090,549 | 2/1992 | Thiel | 198/318 X |
| 5,188,210 | 2/1993 | Malow | 198/587 X |
| 5,284,252 | 2/1994 | Bonnet | 209/552 |
| 5,383,760 | 1/1995 | Cawley et al. | 198/415 X |
| 5,421,446 | 6/1995 | Koch et al. | 198/817 X |
| 5,430,282 | 7/1995 | Smith et al. | 235/455 |
| 5,438,188 | 8/1995 | Surka . | |

FOREIGN PATENT DOCUMENTS

| 0517110 | 12/1992 | (EP) . | |
| 287606 * | 3/1928 | (GB) | 209/650 |
| 07267351 | 10/1995 | (JP) . | |

* cited by examiner

Primary Examiner—Tuan N. Nguyen
(74) Attorney, Agent, or Firm—Alston & Bird, LLP

(57) ABSTRACT

The present invention reveals an automated sorting device capable of receiving articles from an input source, correctly choosing among which of many output destinations to direct the articles, and transferring those articles without slowing the sorting process. To accomplish its purpose, a sorting conveyor is pivoted at its receiving end about both a horizontal axis and a vertical axis. The sorting conveyor is cradled within a vertically moveable carriage which, in turn, is mounted within a horizontally moveable frame. The frame is driven horizontally and the carriage driven vertically to align the conveyor's output end with each output destination. In a preferred embodiment, tracks attached to a support structure stabilize the frame and a controller positions the frame and carriage in response to destination indicia associated with each article to be sorted.

30 Claims, 4 Drawing Sheets

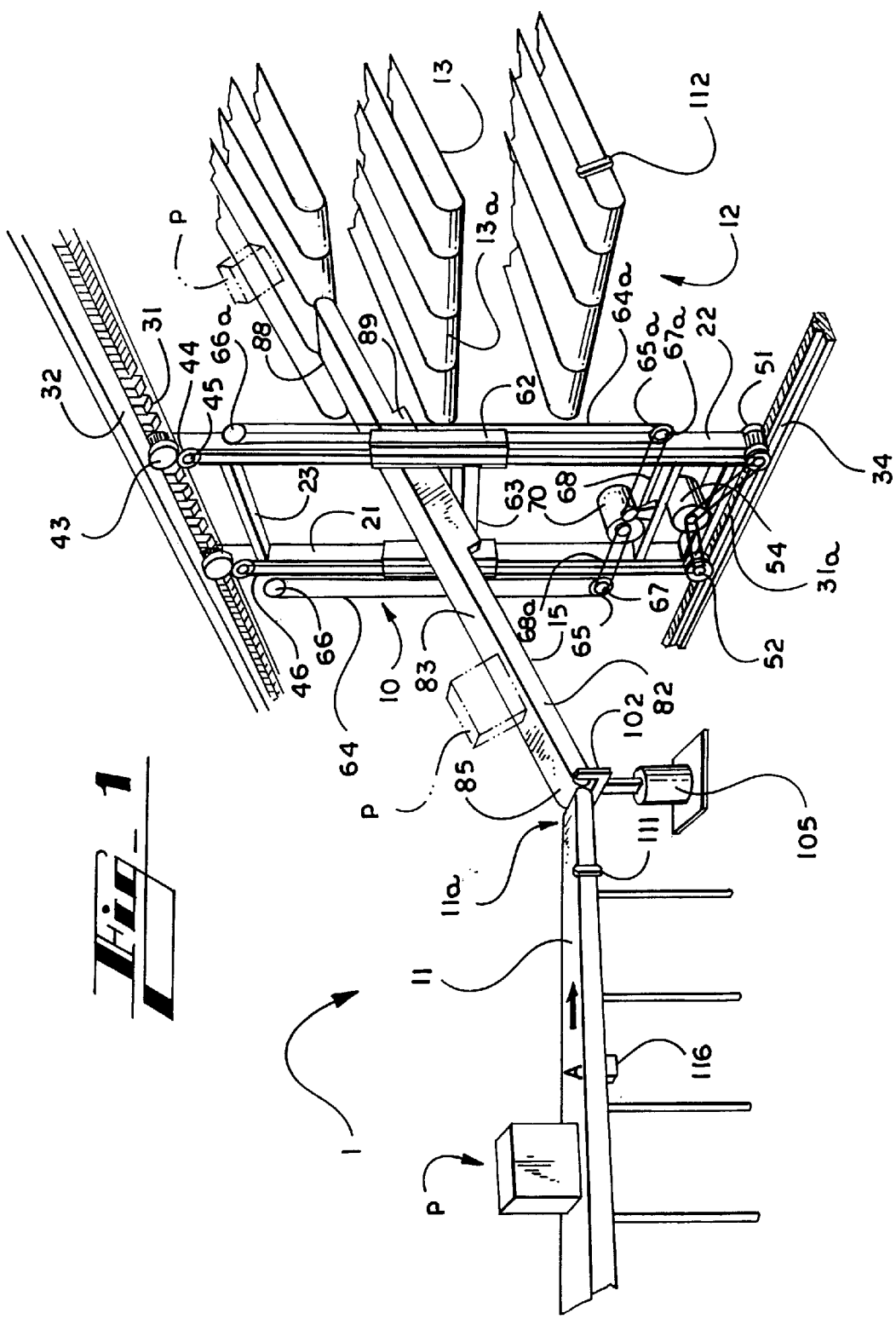

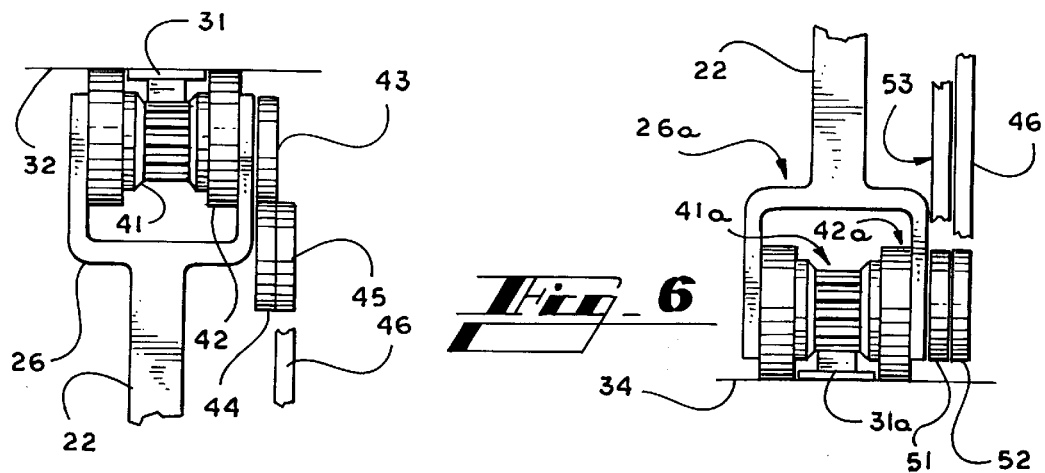
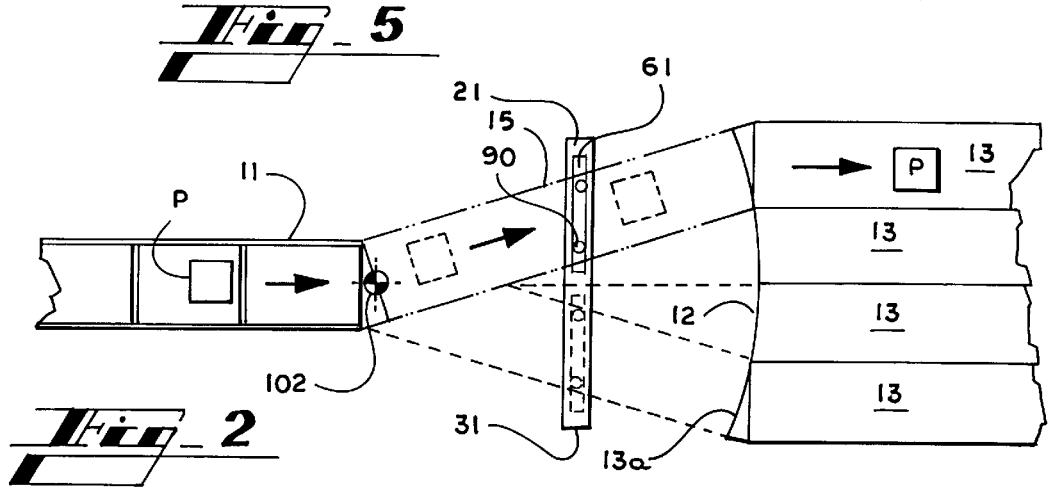
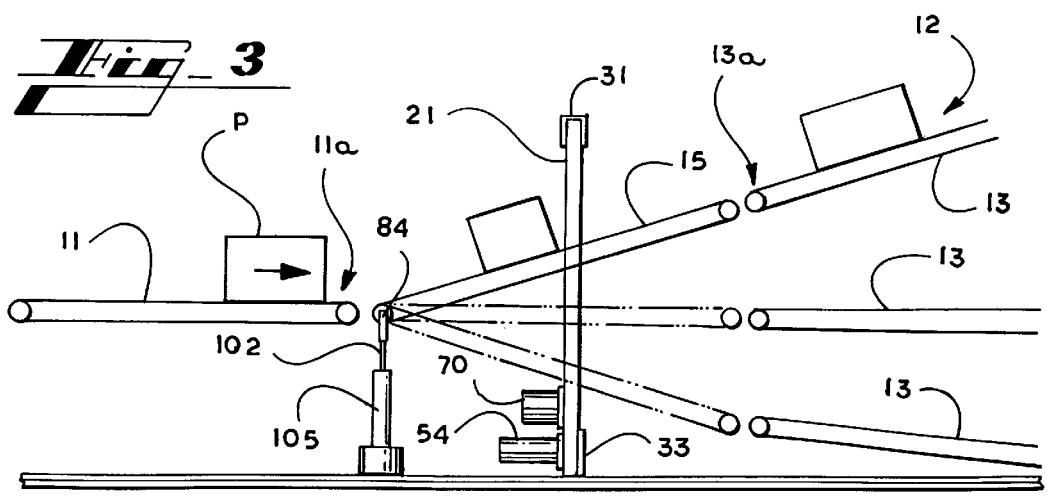

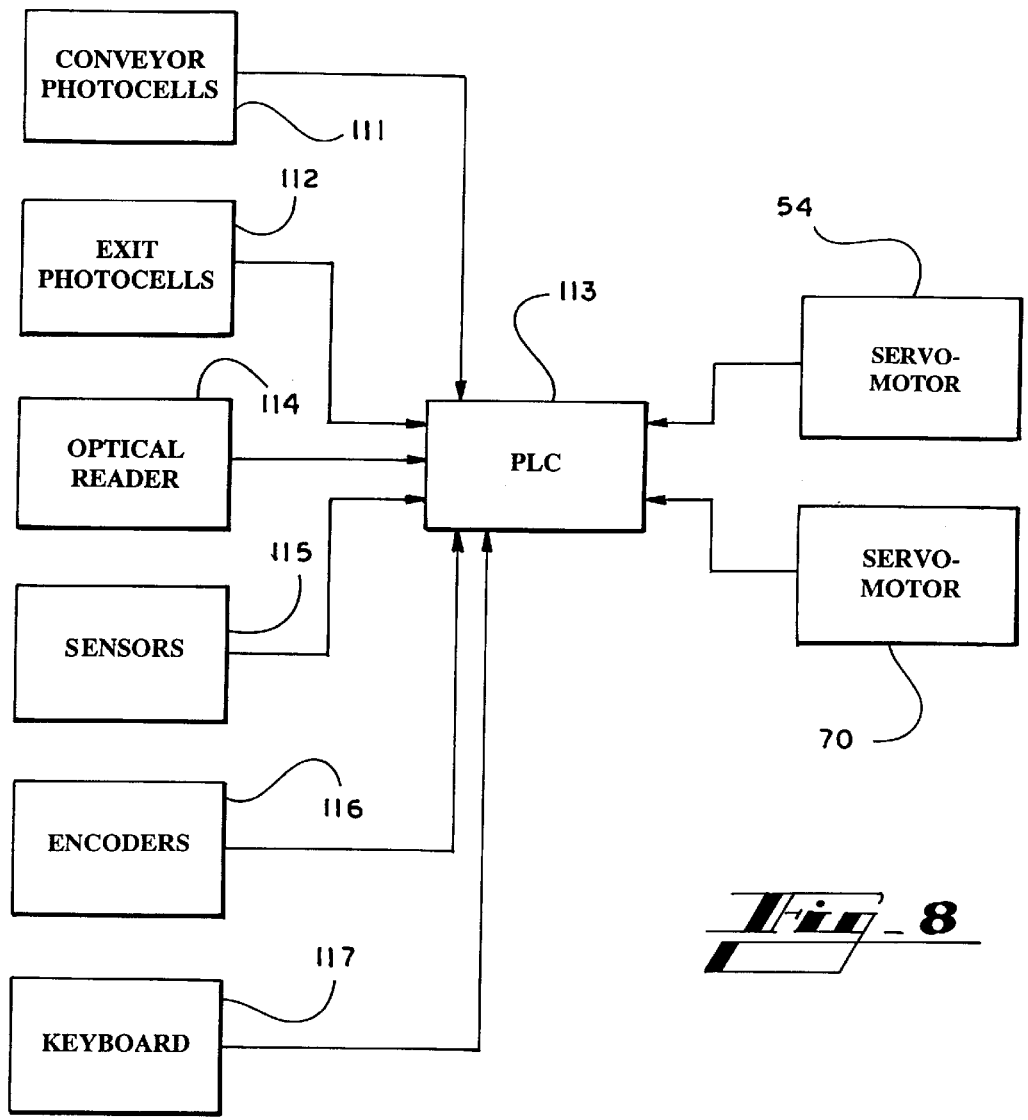
_Fig_8
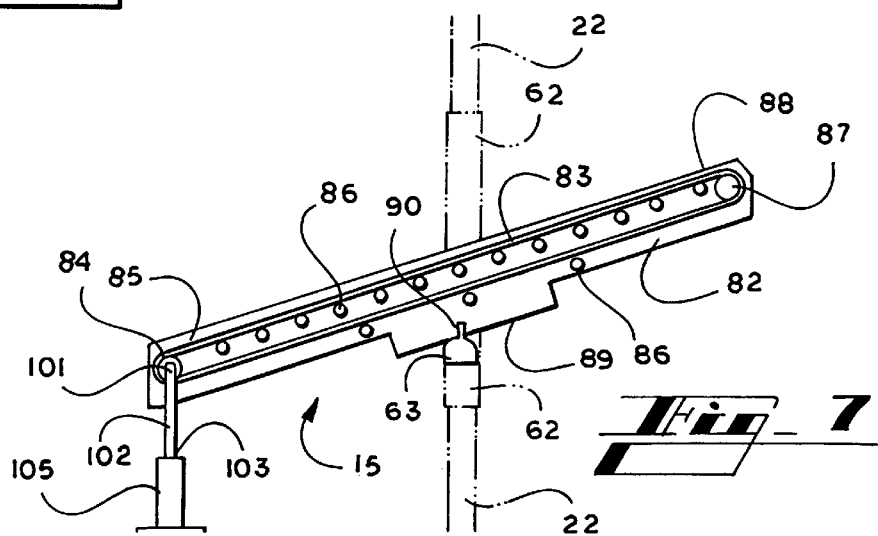
_Fig_7

AUTOMATED ARRAY SORTER FOR CONVEYORS

TECHNICAL FIELD

The present invention relates to the automatic sorting of articles bound for different geographical locations and more particularly relates to a modular automatic sorting device, intended for installation within an existing sorting system, which receives articles from a feed conveyor and transfers them to an appropriate output conveyor under programmed control.

BACKGROUND ART

Daily, package delivery companies collect millions of packages from thousands of locations scattered over large geographical areas and transport them to sorting facilities for processing. After processing, the packages are carried to an equally large number of scattered destinations. To meet the rigorous schedules of today's business environment, while providing accurate deliveries of packages whose final destinations are literally everywhere in the world, sorting facilities are equipped with automated transfer systems whenever possible. These transfer systems must be fast, durable, easy to repair or replace, and provide gentle but accurate handling of each package.

Initially, laborers employed throughout the sorting facility comprised the sorting process; that is, they had to grab, lift, carry and place packages from one sorting station to another. Such use of labor produced an exceedingly slow and inefficient system that was plagued with human injury. While extensive use of labor has diminished as new and large sorting facilities are equipped with automated sorting and transfer systems, the sorting processes at old and small facilities often still rely on laborers at critical stations that require decisions regarding package placement. For example, at some old and small sorting facilities, conveyors typically feed packages to a cluster of laborers who must individually chose a package, pick it up, read the zip code or foreign address, then place the package on an output belt or into a chute associated with the packages' destination. This process is repeated in successively finer steps until the package is loaded onto a delivery vehicle assigned to a limited geographic area.

Those critical stations which are not automated remain burdened with the problems of manual labor and continue to be the source of delays and errors in an otherwise efficient process. Retrofitting these critical stations with automated devices is one solution taught by the automated sorting systems found in new facilities. For example, it is known to position a feed conveyor so that articles may be received from a single input source and transferred to a single output destination. In addition, it is known to adjust the feed conveyor so that articles may be transferred to additional output destinations. To accomplish the latter, an operator typically positions the feed conveyor between the input and desired output destination before loading articles onto the conveyor. However, such systems require an operator, are not readily adaptable to existing sorting systems, occupy a large amount of space, include complex mechanisms that are relatively difficult to repair, and are unable to move as fast as the existing automated transfer process.

U.S. Pat. No. 4,813,526 (Belanger) discloses a mobile conveyor unit that requires an operator to manipulate each change in destination; that is, swing laterally, raise or lower, and extend or retract the conveyor so articles can be transferred from one position to another. This transfer system is built with two conveyors and a large frame on a curved track that guides the sub-frame side to side while the transfer conveyor, pivoting about a horizontal axis at its entry end, moves up and down by means of hydraulic cylinders.

Similarly, U.S. Pat. No. 2,212,702 (Scott) describes a portable conveyor unit that requires an operator to position the frame then align the main conveyor by pivoting its entry end about a horizontal axis. The main conveyor extends from the horizontal axis, through a pair of upright posts, and terminates at an unsupported free end. The conveyor itself is raised and lower by cables and a winch, but has no provision for lateral movement once the frame is set in place. After the conveyor is positioned vertically, a safety rod is inserted through both the posts and conveyor to provide additional support for the conveyor while in its fixed position.

The transfer system disclosed in U.S. Pat. No. 5,090,549 (Thiel) is built of a series of conveyor sections which include a section that pivots about a horizontal axis for vertical movement and about a vertical axis for horizontal movement.

U.S. Pat. No. 1,753,036 (Williamson) discloses a manually powered letter sorter with a conveyor that can be raised or lowered and swung laterally between three positions in order to line up with a specific pigeonhole. The conveyor is aligned manually through the manipulation of levers and plungers.

While prior art teaches alignment of a feed conveyor between the input source and output destination, to achieve the desired alignment such devices require an operator to stop the apparatus, physically maneuver the feed conveyor as required, then restart the device before continuing the transfer process. Because each alignment requires shutdown, physical manipulation of the conveyor or conveyor controls, and start-up, these devices are incapable of rapid response to destination changes.

Portability, a strength in some prior art devices, is also a flaw when considering adoption into an existing process. For example, the drivable chassis of Belanger ('526) and bulky supporting structure of Scott ('702) prohibit integration within an enclosed structure of limited space. The Thiel ('549) apparatus, even if scaled down, is so large and complicated that it appears entirely restricted to outdoor use.

The primary thrust of the prior art devices, that include powered mechanisms for changing the orientation of a conveyor, is transferring as opposed to sorting articles. Such devices are capable of some degree of flexibility to provide alignment between input source and output destination, but are limited by lack of responsiveness. On the other hand, the manually operated Williamson ('036) device incorporates sorting capabilities but is limited by the cantilever conveyor design to very light and small articles, and is slow because it lacks automation.

Thus, existing transfer systems require an operator; are complex both mechanically and electrically; are by their nature large, bulky, slow and noisy; require significant maintenance; are not suitable for application in existing sorting facilities; and, where they do provide a means for sorting are slow and limited to very small and light articles. Accordingly, there has long existed a need in the art for a device that both transfers and sorts, does not require an operator, is simple in construction, requires little maintenance, is suitable for applicable in existing processes, provides a high throughput of sorted items per occupied floor space, and operates at a speed compatible with other automated devices in an automated process.

SUMMARY OF THE INVENTION

The present invention seeks to cure the process problems and prior art inadequacies noted above by replacing laborers at critical stations with an automatic sorting device capable of receiving articles from an input source such as a feed conveyor, correctly choosing which of many output destinations to direct the articles, and transferring those articles without slowing the existing automated system.

In accordance with the invention, these objectives are accomplished by providing a device for automatically distributing articles, comprising: a sorting conveyor mounted to a pivot at its receiving end; a frame including a carriage that cradles the sorting conveyor between its receiving and output ends; an array of output destinations; means for moving the frame along a linear path from side to side in front of the array; and a controller capable of positioning the frame and carriage so the sorting conveyor is aligned to transfer the article from the input conveyor to the output destinations. In the preferred embodiment for operation, the sorting conveyor receiving end is pivoted about a horizontal and vertical axis so that the output end can be elevated or lowered by the carriage to mate with output conveyors on at least three levels, and swung laterally by the frame to mate with output conveyors on at least four positions on each level.

The alignment of the sorting conveyor from the pivot to the desired output conveyor within the array preferably is accomplished by a translating frame and carriage assembly. Preferably, the frame is in contact with fixed upper and lower toothed rails, located a convenient distance in front of the array center and perpendicular to the feed conveyor, driven by toothed wheel and tire assemblies connected by a drive belt configuration and reversible servo-motor. The vertical legs of the frame guide a carriage which is raised or lowered by another reversible servo-motor and drive belt configuration. The sorting conveyor rests within the carriage and follows passively in response to the position of either frame or carriage. Horizontal translation of the frame in combination with vertical positioning of the carriage provides the range of motion necessary to align the sorting conveyor output end to any of twelve output conveyors in the output array.

In practice, the frame and carriage are directed by destination information affixed to the article and input to a programmed logic controller by an optical reader. A shaft encoder on the feed conveyor can track the article while photocells at the output conveyors confirm the article has been discharged onto the proper output conveyor.

While the above describes the preferred embodiment, variations and alternative embodiments are readily apparent. For example, though the sorting module is intended as a retrofit, it is suitable for new systems; any number of sources may replace the feed conveyor as the source of articles; a chute or other method of conveyance may replace the sorting conveyor; any number of different wheel and surface combinations may support, guide, or drive the frame; and, any number of receptacles may replace the output conveyors as destinations. Finally, by reversing the direction of all the conveyors, the sorting device may be effectively employed as a collecting device. Normally, the final destination for a package within the sorting facility is a delivery vehicle such as a truck. Such collecting devices would contribute to an efficient sorting system by accepting pre-sorted articles from stations throughout the sorting facility and directing them to their respective delivery vehicles.

BRIEF DESCRIPTION OF THE DRAWINGS

FIG. 1 is a perspective view of the sorting device.

FIG. 2 shows a top diagrammatic view of the sorting device embodying the present invention.

FIG. 3 shows a side diagrammatic view of the sorting device embodying the present invention.

FIG. 5 is an end elevation view of the upper wheel assembly and track of FIG. 4, taken along section line '5—5' of FIG. 4.

FIG. 6 is an end elevation view of the lower wheel assembly and track of FIG. 4, taken along section line '6—6' of FIG. 4.

FIG. 7 is a longitudinal cross-section view of the sorting conveyor assembly.

FIG. 8 is a block diagram outlining operation of the sorting system under control of a digital controller.

DETAILED DESCRIPTION

Figure 4:
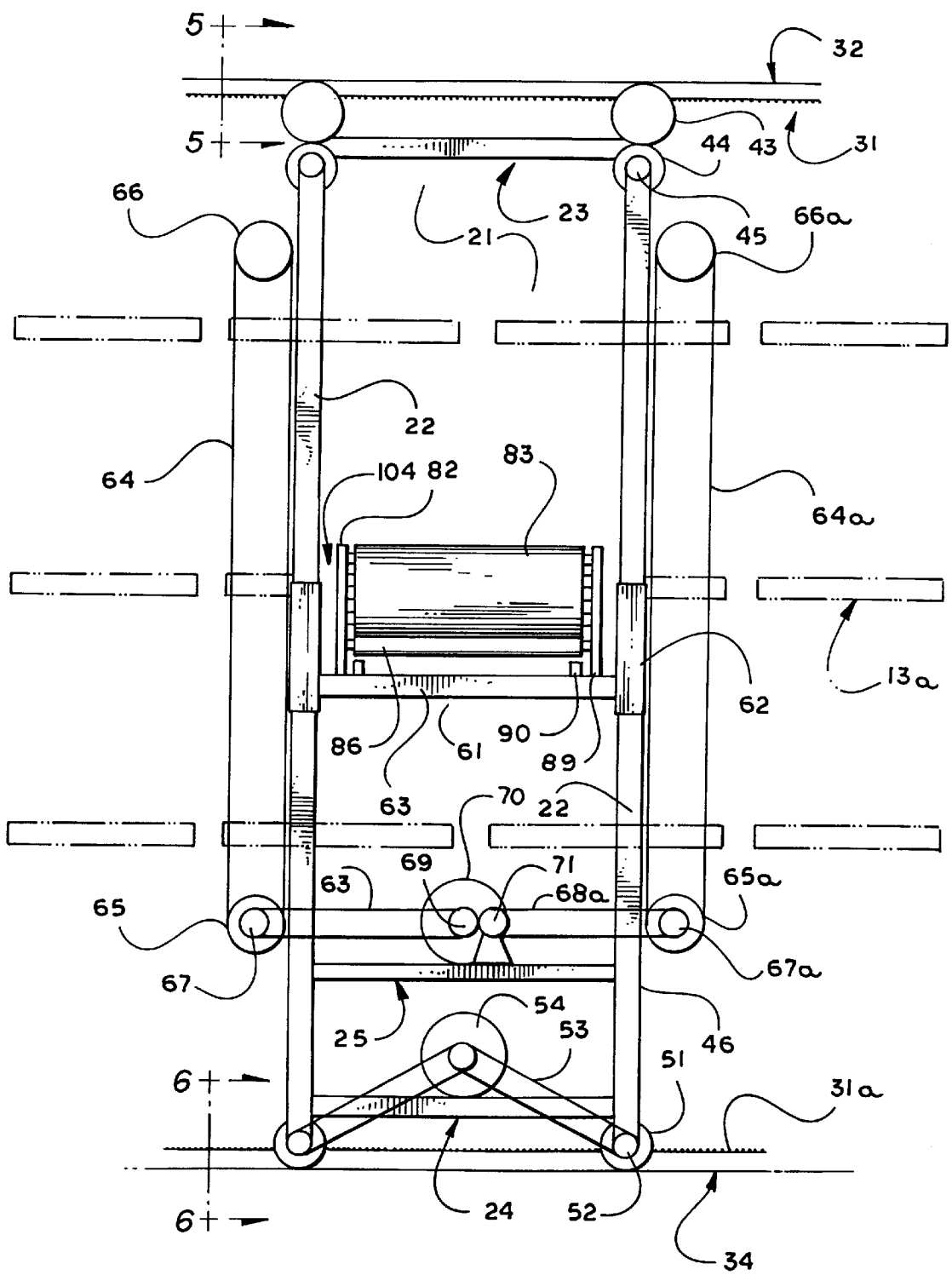
FIG. 4 is a front elevation view of the sorting device.

Referring now in more detail to the drawings, in which like numerals refer to like parts throughout the several views, FIG. 1 shows a modular automatic sorting device 10 embodying the present invention. One or more sorting devices 10 may be incorporated in an existing sorting system 1 between a feed conveyor 11 and an output array 12. The feed conveyor 11 transfers articles to be sorted, such as parcels P, in the direction of arrows A. The sorting device 10 receives parcels P from a output end 11a of the feed conveyor 11. Prior to transfer, the parcels' destination within the output array 12 is relayed to the sorting device 10. In a manner described in detail below, a sorting conveyor 15 of the sorting device 10 transfers parcels P by acting as a conduit between the feed conveyor output end 11a to a receiving end 13a of a pre-selected array conveyor 13 within the output array 12. It will be understood that one or all of the output destinations may be chutes, receptacles, or the like, rather than conveyors; and, more or less than twelve output destinations may exist. Also, the present invention can be used with many different types of feed conveyors, such as belt and powered roller variations.

Referring now to FIG. 4, a sub-assembly of the sorting device 10, necessary to provide horizontal alignment between the feed conveyor output end 11a and array conveyor receiving end 13a, is a translating frame 21 which supports the sorting conveyor 15. Rectangular in shape, the translating frame 21 is formed by two opposite vertical legs 22 connected by an upper horizontal end brace 23 and a lower horizontal end brace 24. An intermediate horizontal cross brace 25 bridges the vertical legs 22 a short distance above the lower end brace 24. Referring now to FIGS. 5 and 6, the vertical legs 22 extend beyond the end braces 23 and 24 to form yokes 26 and 26a, respectively, located just beyond each upper and lower corner of the frame perimeter. Ratably mounted within the yokes 26 and 26a are toothed wheels 41 and 41a, respectively, as well as a pair of high friction wheels 42 flanking each toothed wheel 41, and a pair of high friction wheels 42a flanking each toothed wheel 41a. The wheels 42 and 42a may be surrounded by coatings or tires made of rubber or a high friction polymer. Extruded solid or hollow structural metal, or other suitably strong materials, may be utilized to construct the frame, yokes and accompanying bracing with connections made in a known manner.

To both support and guide the translating frame 21, an upper toothed track 31 is mounted on an upper structural surface 32 and a lower toothed track 31a is mounted on a lower structural surface 34. The teeth of the tracks 31 and 31a are of such size and spacing that they smoothly engage, tooth face to tooth flank, with toothed wheels 41 and 41a respectively. The toothed tracks 31 and 31a are respectively mounted to the surfaces 32 and 34, each of which extend beyond the width of the toothed tracks 31 and 31a sufficiently to provide a pair of high friction surfaces for engaging the wheels 42 and 42a with adequate traction. Extruded solid or hollow structural metal, or other suitably strong materials, may be used to construct the toothed tracks and adjacent surfaces with connections made in a known manner. Referring now to FIGS. 2 and 3, the preferred form reveals the upper toothed track 31 and lower toothed track 31a are positioned to form straight lines directly in front of and approximately parallel to the face of the output array 12, and thus approximately at right angles to the feed conveyor 11.

The toothed wheel 41 of each upper yoke 26 is sandwiched between the two tire wheels 42 and connected to a spur assembly driven gear 43 through an axle (not shown). The toothed wheels 41 are in constant contact with the upper toothed track 31, and the tire wheels 42 are in constant contact with the structural surface 32.

The spur assembly driven gear 43 is permanently engaged to a spur assembly drive gear 44 which in turn is rigidly affixed to an upper driven notched pulley 45. The upper notched pulley 45 is belted by a long notched drive belt 46 which is looped and powered in a fashion described in detail below. For the frame 21 to be driven horizontally along the tracks, the upper toothed wheels 41 and tire wheels 42 must rotate at the same time and speed but in the opposite direction to the lower toothed wheels 41a and tire wheels 42a. When rotated by the long notched drive belt 46, the upper pulley 45 and drive gear 44 follow and rotate in the same direction. However, the driven gear 43, in conjunction with the drive gear 44, reverses the direction of rotation imparted to the tires wheels 42 and toothed wheels 41; that is, they rotate in a direction opposite to the drive belt 46.

Referring now to FIG. 6, located within each lower yoke 26a the lower wheel assembly comprised of the toothed wheel 41a sandwiched between two tire wheels 42a is connected by an axle (not shown) to a lower inside notched pulley 51 which is rigidly affixed to a lower outside notched pulley 52. The toothed wheel 41a is in constant contact with the lower toothed track 31a, and the tire wheels 42a are in constant contact with the structural surface 34. The outside notched pulley 52 is belted by the long notched drive belt 46 and the inside notched pulley 51 is belted by a short notched drive belt 53 which, referring now to FIG. 4, is looped to a wheel drive reversible servo-motor 54 mounted on the lower end brace 24.

When rotated by the servo-motor 54, the short notched drive belt 53 turns the inside notched pulley 51, outside notched pulley 52, toothed wheel 41a and tire wheels 42a as well as the long notched drive belt 46 that is looped to the upper driven notched pulley 45, all in the same direction. The spur assembly drive gear 44 follows the notched pulley 45 but, in concert with the driven gear 43 reverses the direction of rotation. Accordingly, the upper toothed wheels 41 and tire wheels 42 are driven simultaneously along the toothed track 31 and adjacent surface 32, as the lower toothed wheel 41a and tire wheels 42a are driven in the same direction along the toothed track 31a and adjacent surface 34. Linear motion of the translating frame 21 moves the sorting conveyor 15, described in detail below, between the positions shown in dashed lines in FIG. 2. As shown, the receiving ends 13a of the array conveyors preferably form an arc so that the sorting conveyor 15 can be positioned closely to each array conveyor 13 as the sorting conveyor pivots about its input end.

Referring again to FIG. 4, another sub-assembly of the sorting device 10, necessary to provide vertical alignment between the feed conveyor output end 11a and array conveyor receiving end 13a, is a carriage 61. The preferred embodiment reveals the carriage 61 is mounted within the translating frame 21 by sleeves 62 fitted to encase the respective vertical leg 22, the sleeves and legs being separated only by a friction reducing surface or lubricant (not shown). At identical locations from the bottom end of both sleeves 62, a rounded-top sorting conveyor support 63 is attached between the sleeves 62 with connections made in a known manner. The sleeves 62, together with the sorting conveyor support 63, form a channel shaped cradle that is raised and lowered within the translating frame 21 in a fashion described in detail below.

Attached to the outside face of each sleeve 62 in a known manner is a medium length notched drive belt 64 and 64a. Each drive belts 64 and 64a loop an inside notched pulley 65 and 65a at one end and a smooth idler pulley 66 and 66a at the opposite end. The inside notched pulley 65 and 65a is rigidly affixed to an outside notched pulley 67 and 67a which in turn is belted by a short notched drive belt 68 and 68a. For the carriage 61 to be driven vertically within the frame 21, the medium notched drive belts 64 and 64a must rotate at the same time and speed but in opposite directions. This is accomplished by the short notched drive belt 68 being looped at an end opposite the pulley 67 to a carriage servo-motor notched pulley 69 and rotated by a carriage reversible servo-motor 70 mounted on the horizontal cross brace 25. In similar fashion, the short notched drive belt 68a is looped at an opposite end to a notched pulley 71, also mounted on the horizontal cross base 25, and rigidly affixed to a spur assembly driven gear 72 (not shown). The driven gear 72 is permanently engaged with the spur assembly drive gear 73 (not shown) which is mounted on the servo-motor 70 axle (not shown) directly behind the notched pulley 69.

When directed, the servo-motor 70 rotates the notched pulley 69 which drives the short notched drive belt 68, the outside notched pulley 67 and inside notched pulley 65, the medium notched drive belt 64, and smooth idler pulley 66 all in the same direction. Simultaneously, the servo-motor 70 rotates the spur assembly driver gear 72 which, in concert with the driven gear 72 reverses the direction of rotation for notched pulley 71, short notched drive belt 68a, outside notched pulley 67a and inside pulley 65a, the medium notched drive belt 64a, and smooth idler pulley 66a. Accordingly, the sleeves 62 are raised and lowered simultaneously along the vertical legs 22 by drive belts 64 and 64a rotating in opposite directions. The resulting vertical motion of the carriage 61 moves the sorting conveyor 15 between the positions shown in FIG. 3.

Referring now to FIG. 7, another sub-assembly of the sorting device 10, necessary to actually transport the parcels P from the feed conveyor 11 to the array conveyor 13, is the sorting conveyor 15. The preferred embodiment shows a sorting conveyor frame 82 formed of suitably strong material similar to the translating frame 21 and carriage 61, sheathed along both sides and attached with connections made in a known manner. An endless conveyor belt 83 is mounted over an end roller 84, located at the sorting conveyor receiving end 85, rests on a plurality of idler rollers 86 mounted the length of the conveyor frame 82, and passes around a motorized end roller 87 to define the sorting conveyor output end 88. Along the bottom of the conveyor frame 82 are mounted a plurality of idler rollers 86 which support the return side of the conveyor belt 83, and a pair of conveyor runners 89 with low friction surface. As shown in FIG. 4, attached to the conveyor support 63 and located between the two conveyor runners 89 are two directional guideposts 90.

The sorting conveyor frame 82 is pivotally mounted at the receiving end 85 about a horizontal axis 101 to a support yoke 102. The yoke 102 is pivotally mounted at a pivot joint 103 to provide rotation about a vertical axis with respect to a support frame 105. The sorting conveyor 15 extends from the yoke 102 to a position within the carriage 61, between the sleeves 62 with the conveyor runners 89 resting directly on the sorting conveyor support 63. The conveyor support 63 is of sufficient width to provide a sliding fit or slight gap 104 between each side of the sorting conveyor frame 82 and the adjacent sleeve 62; that is, the conveyor support 63 is long enough to permit the conveyor frame 82 an unrestricted range of motion when the sorting conveyor is aligned with the outermost array conveyors 13 of the output array 12. This configuration, where the conveyor receiving end 85 is supported about a horizontal axis 101 and vertical axis 103, and where the conveyor frame 82 is supported by the conveyor runners 89 so that the conveyor output end 88 is cantilevered out beyond the translating frame 21, permits the directional guideposts 90 to direct the sorting conveyor frame 82 as the frame 21 is driven horizontally and the carriage 61 is driven vertically to mate the conveyor output end 88 with the pre-selected array conveyor receiving section 13a.

The output array 12 is a matrix of output destinations that is formed by array conveyors 13 three rows high and four columns wide, positioned and shaped so that each array conveyor receiving end 13a can mate with the sorting conveyor output end 88. Each array conveyor receiving end 13a accepts parcels P from the sorting conveyor output end 88 and transports the parcels P to the next step of the sorting system. In the preferred embodiment, the array conveyors 13 are continuously moving. Output destinations may include chutes, receptacles or the like and be more or less than twelve in arrays of varying configurations.

Referring now to FIG. 1, triangular beam photocells 111 are positioned astride the feed conveyor output end section 11a just upstream of the entrance to the sorting device 10, to provide a signal indicating a parcel P is entering the sorting device. At each array conveyor 13, an exit confirmation photocell 112 is positioned adjacent to where parcels leave the sorting conveyor belt 83. The photocells 112 are retro-reflective photocells that provide a signal when a parcel passes.

Referring to the block diagram of FIG. 8, the operation of the sorting device 10 is automated through the use of a digital controller, such as a programmable logic controller 113 (PLC), or a general purpose computer having an appropriate microprocessor. The PLC may receive input signals from an optical reader 114 that reads barcode or two-dimensional symbols (such as MaxiCode symbols) on labels on the parcels. Such a symbol may contain address information which allows the PLC to determine, in a well known manner, which is the correct array conveyor 13 to receive the parcel. The PLC may also receive information about the parcel directly from sensors 115, such as a scale or a device for measuring the dimensions of the parcel P. A set of rotary belt encoders 116 are positioned to measure the displacement of the feed conveyor 11 and the output of these encoders 116 is input to the PLC. Parcel information may also be manually entered at a keyboard 117. The PLC, in response to these input signals, sends control signals to the wheel drive servo-motor 54 and carriage servo-motor 70 which move the respective frame drive and carriage drive elements.

In operation of a sorting system 1 that incorporates a sorting device 10, parcels are placed on the feed conveyor 11. The PLC receives input from the rotary belt encoders 116 associated with the conveyor 11, and from the optical reader 114 or an alternative label reader or manual input device. The optical reader or other input device is used to acquire destination data about each package as the package is placed onto the sorting system. Any bar codes or other symbols on a parcel are detected and decoded. Destination information may be embedded in a dense code, or may be stored in a database location the address of which is contained in a bar code. Furthermore, textual address information on the parcel label can be analyzed using OCR techniques.

When a package is imaged at the reader 114, the current count of the encoder 116 is obtained. The rotary encoder device 116 allows the PLC to track how far the feed conveyor 11 has traveled since any particular package was placed onto the feed conveyor. The photocells 111 inform the PLC when a parcel leaves the feed conveyor output end 11a and enters the sorting conveyor receiving end 85.

A suitable optical reader system for imaging labels is shown in U.S. Pat. Nos. 5,291,564; 5,308,960; 5,327,171; and 5,430,282 which are incorporated herein by reference. Systems for locating and decoding bar codes and the Maxi-Code dense code symbology are described in U.S. Pat. Nos. 4,874,936; 4,896,029; 5,438,188; 5,412,196; 5,412,197; 5,343,028; 5,352,878; 5,404,003; 5,384,451 and PCT Publication No. WO 95/34043.

A record for each package stored in the PLC memory may contain the parcel identification, destination address, and package characteristics. In addition, a description of the contents of the parcel, its dimensions and weight, or a code indicating the contents are fragile or hazardous or have some other special status, may be stored.

Once the destination information for the parcel is known, the PLC looks in an appropriate part of its memory for the proper array conveyor 13 corresponding to the parcel's destination. Preferably, this information is stored in fields of a record already created for the parcel.

In a known manner, the PLC 113 determines when a parcel P is approaching the sorting device 10 and to which array conveyor 13 the parcel should be transferred. The PLC reads the encoder counts and photocell 111 signals as the parcel travels, and compares this position information to the discharge location information stored in memory. The belts of the sorting conveyor 15 and the array conveyors 13 preferably are continually in motion. When the PLC receives signals indicating that the parcel has reached the sorting conveyor receiving end 85, the PLC sends control signals to the wheel drive servo-motor 54 and carriage drive servo-motor 70 instructing the servo-motors to position the translating frame 21 and carriage 61 as required to align the sorting conveyor output end 88 to mate with the appropriate array conveyor receiving end 13a. It will be understood that the PLC need store only four positions for the servo-motor 54 and three positions for the servo-motor 70 corresponding to alignment of the twelve conveyors 13 within the output array 12, but these position requirements would change if a different number of array conveyors were provided in the array.

Those skilled in the art should understand that the programs, processes, methods, etc. described herein are not related or limited to any particular computer or apparatus. Rather, various types of general purpose machines may be used with programs constructed in accordance with the teaching described herein. Similarly, it may prove advantageous to construct specialized apparatus to perform the method steps described herein by way of dedicated computer systems with hard-wired logic or programs stored in nonvolatile memory, such as read only memory.

From the foregoing description, it is seen that an automatic sorting device embodying the present invention, and specifically the novelty of a passively following sorting conveyor cradled by a carriage mounted within a transversing frame, is of appropriate scale, speed and flexibility to perform within an existing automated sorting system, provide a high throughput of parcels to be sorted, does not require an operator, is simple both mechanically and electrically, is quickly constructed, and requires little maintenance.

While the present invention in its various aspects has been described in detail with regard to preferred embodiments thereof, it should be understood that variations, modifications and enhancements can be made to the disclosed apparatus and procedures without departing from the spirit and scope of the present invention as defined in the appended claims.

What is claimed is:

1. An apparatus for automatically distributing articles from a source to a plurality of destinations, said plurality of destinations forming an array, and said apparatus comprising:
    a sorting conveyor, mounted at a receiving end to a pivot which is pivotable about a horizontal axis and a vertical axis, defining a distributing end spaced apart from said receiving end;
    a frame including a carriage which loosely cradles said conveyor between said receiving and distributing ends;
    first means for moving said frame horizontally along a straight line path, causing said conveyor to rotate about said vertical axis;
    means for stabilizing said frame as it moves along said path;
    means for engaging said frame with said means for stabilizing;
    second means for moving said carriage vertically, causing said conveyor to rotate about said horizontal axis; and
    a controller configured to operate said first and second means for moving to align said distributing end with any of said destinations;
    wherein said means for stabilizing comprises a track in contact with a plurality of wheels attached to a bottom end and a top end of said frame.

2. The apparatus of claim 1, wherein said pivot provides said conveyor sufficient range of motion to permit said conveyor passive movement within said carriage as said distributing end moves between any pair of opposite peripheral destinations of said array.

3. The apparatus of claim 1, wherein said destinations are spaced in said array both vertically and horizontally from one another, and positioned to sufficiently mate with said distributing end so as to enable uninterrupted transfer of said articles.

4. The apparatus of claim 1, wherein said path is of sufficient length to enable said frame to align said distributing end with any pair of opposite peripheral destinations.

5. The apparatus of claim 1, wherein said wheels are rotably connected to said first means to propel said frame along said track.

6. The apparatus of claim 1, wherein said frame comprises a pair of spaced apart vertical supports; and wherein said carriage comprises a pair of followers connected by a cross-member, said followers mounted for travel along said vertical supports, and wherein said cross-member is of sufficient width to cradle said conveyor and permit said conveyor a full range of passive movement relative to said frame and said carriage.

7. The apparatus of claim 1, wherein said controller is operative to move said frame horizontally along said straight path, so as to enable alignment of said distributing end with horizontally-spaced peripheral destinations of opposite edges of said array and with each said destination located in-between and parallel thereto.

8. The apparatus of claim 1, wherein said controller is operative to move said carriage vertically along said frame, so as to enable alignment of said distributing end with vertically spaced peripheral destinations of opposite edges of said array and each said destination located in-between and parallel thereto.

9. The apparatus of claim 1, wherein said controller is operative to receive destination information for each article, and to operate said first and second means to move said frame and said carriage responsive to said destination information.

10. The apparatus of claim 9, further comprising an optical reader positioned to read destination information printed on a label affixed to said articles.

11. An apparatus for automatically distributing articles from a source to a plurality of destinations forming an array, comprising:
    a sorting conveyor, mounted at a receiving end to a pivot about a horizontal axis and a vertical axis, defining a distributing end spaced apart from said receiving end;
    a frame including a carriage which loosely cradles said conveyor between said receiving and distributing ends;
    first means for moving said frame horizontally along a path, causing said conveyor to rotate about said vertical axis;
    second means for moving said carriage vertically, causing said conveyor to rotate about said horizontal axis;
    an optical reader positioned to read destination information printed on a label affixed to said articles; and
    a controller operative to receive said destination information and configured to operate said first and second means for moving to align said distributing end with any of said destinations responsive to said destination information.

12. An apparatus for automatically distributing articles from a source to a plurality of destinations, said plurality of destinations forming an array, and said apparatus comprising:
    a pivoting conveyor defining a receiving end mounted to pivot about both a horizontal axis and a vertical axis and defining a distributing end spaced apart from said receiving end; and
    a sorting drive mechanism comprising:
        an upwardly opening cradle positioned to loosely receive said pivoting conveyor intermediate said receiving and distributing ends thereof,
        a vertically extending leg mounted for movement along a horizontal track,
        said cradle being mounted for vertical movement along said vertical leg, said vertical movement pivoting said pivoting conveyor about said horizontal axis, and
        said track being disposed such that movement of said vertical leg along said track pivots said pivoting conveyor about said vertical axis,
        a first drive assembly connected to translate said vertical leg along said track,
        a second drive assembly connected to move said cradle vertically along said vertical leg, and
        a controller configured to operate said first and second drive assemblies to substantially align said distributing end with at least one of said destinations.

13. The apparatus of claim 12, wherein said vertical leg is a first vertical leg and further comprising a second vertical leg spaced apart from said first vertical leg.

14. The apparatus of claim 13, wherein said cradle is positioned between and mounted for vertical movement along said first vertical leg and said second vertical leg.

15. The apparatus of claim 14, wherein said cradle comprises:
   a first follower mounted for vertical movement along said first vertical leg;
   a second follower mounted for vertical movement along said second vertical leg; and
   a supporting cross-member extending between said first follower and said second follower, said cross-member being of sufficient width to permit passive movement of said conveyor relative to said cross-member and said first and second vertical legs.

16. A method of automatically distributing an article from a source to one of a plurality of destinations, said plurality of destinations forming an array and said method comprising the steps of:
   providing a pivoting conveyor defining a receiving end mounted to pivot about both a horizontal axis and a vertical axis and defining a distributing end spaced apart from said receiving end;
   providing an upwardly opening cradle positioned to loosely receive said pivoting conveyor at a first position intermediate said receiving and distributing ends of said cradle;
   moving said cradle horizontally so that said pivoting conveyor pivots about said vertical axis and so that said cradle receives said pivoting conveyor at a second position intermediate said receiving and distributing ends; and
   moving said article from a surface of said conveyor to said destination.

17. The method of claim 16, wherein a distance between said first position and said receiving end is greater than a distance between said second position and said receiving end.

18. The method of claim 16, wherein a distance between said first position and said receiving end is less than a distance between said second position and said receiving end.

19. The method of claim 17, further comprising the step of moving said cradle vertically so that said pivoting conveyor pivots about said horizontal axis.

20. The method of claim 19, wherein said steps of moving said cradle horizontally and vertically serve to substantially align said receiving end with said destination.

21. The method of claim 20, wherein said steps of moving said cradle horizontally and vertically are executed in response to a step of scanning destination indicia associated with said article.

22. A method of automatically distributing an article from a source to one of a plurality of destinations, said plurality of destinations forming an array and said method comprising the steps of:
   providing a pivoting conveyor defining a receiving end mounted to a pivot about both a horizontal axis and a vertical axis and defining a distributing end spaced apart from said receiving end;
   providing an upwardly opening cradle positioned to loosely receive said pivoting conveyor at a first position intermediate said receiving and distributing ends of said cradle;
   moving said cradle vertically so that said pivoting conveyor pivots about said horizontal axis and so that said cradle receives said pivoting conveyor at a second position intermediate said receiving and distributing ends; and
   moving said article from a surface of said conveyor to said destination.

23. The method of claim 22, wherein a distance between said first position and said receiving end is greater than a distance between said second position and said receiving end.

24. The method of claim 22, wherein a distance between said first position and said receiving end is less than a distance between said second position and said receiving end.

25. The method of claim 23, further comprising the step of moving said cradle horizontally so that said pivoting conveyor pivots about said vertical axis.

26. The method of claim 25, wherein said steps of moving said cradle horizontally and vertically serve to substantially align said receiving end with said destination.

27. The method of claim 26, wherein said steps of moving said cradle horizontally and vertically are executed in response to a step of scanning destination indicia associated with said article.

28. An apparatus for automatically distributing articles from a source to a plurality of destinations, said destinations forming an array, and said apparatus comprising:
   a sorting conveyor, mounted at a receiving end to a pivot that is pivotable about both a horizontal axis and a vertical axis, defining a distributing end spaced apart from said receiving end;
   a frame including a carriage that cradles said conveyor between said receiving and distributing ends;
   first means for moving said frame horizontally along a path, causing said conveyor to rotate about said vertical axis;
   second means for moving said carriage vertically, causing said conveyor to rotate about said horizontal axis;
   a reader positioned to read destination information affixed to said articles; and
   a controller operative to receive said destination information and configured to operate said first and second means for moving to align said distributing end with any of said destinations responsive to said destination information.

29. An apparatus for automatically distributing articles from a source to a plurality of destinations, said plurality of destinations forming an array, and said apparatus comprising:
   a sorting conveyor defining a receiving end and a distributing end spaced apart from said receiving end, said sorting conveyor being pivotably mounted to a first support member so that said sorting conveyor may be pivoted about both a vertical and a horizontal axis;
   a second support member spaced apart from said first support member and mounted to support a portion of a weight of said conveyor, said second support member having a conveyor support portion that is movable along both a first axis and a second axis;
   a first drive assembly connected to translate said conveyor support portion along said first axis;
   a second drive assembly connected to translate said conveyor support portion along said second axis; and
   a controller configured to operate said first and second drive assemblies to substantially align said distributing end with at least one of said destinations.

30. The apparatus of claim 29 wherein said first axis and said second axis are coplanar.

* * * * *